(12) United States Patent
Cates et al.

(10) Patent No.: US 6,819,528 B1
(45) Date of Patent: Nov. 16, 2004

(54) ASYMMETRIC SERVO READER PLACEMENT IN BI-DIRECTIONAL TAPE HEAD

(75) Inventors: James C. Cates, Superior, CO (US); Steven Trabert, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 511 days.

(21) Appl. No.: 09/696,557

(22) Filed: Oct. 25, 2000

(51) Int. Cl.[7] .............................................. G11B 5/265
(52) U.S. Cl. ................................................... 360/241.1
(58) Field of Search ........................... 360/241.1, 48, 360/77.12, 53, 57, 78.01, 78.06, 77.15, 51, 64, 70, 75, 77.03, 77.07, 121, 119, 122

(56) References Cited

U.S. PATENT DOCUMENTS

| | | | |
|---|---|---|---|
| 5,289,328 A | * | 2/1994 | Saliba .......................... 360/121 |
| 5,541,793 A | | 7/1996 | Schwarz |
| 5,629,813 A | * | 5/1997 | Baca et al. ............... 360/77.12 |
| 5,898,533 A | | 4/1999 | Mantey et al. ................. 360/48 |
| 5,963,401 A | * | 10/1999 | Dee et al. ..................... 360/113 |
| 6,038,108 A | | 3/2000 | Dee et al. ..................... 360/121 |
| 6,278,577 B1 | * | 8/2001 | Aboaf et al. ................. 360/121 |

FOREIGN PATENT DOCUMENTS

| | | |
|---|---|---|
| EP | 0 379 324 A | 7/1990 |
| EP | 0 508 366 A2 | 10/1992 |

* cited by examiner

Primary Examiner—A. J. Heinz
Assistant Examiner—C R Magee
(74) Attorney, Agent, or Firm—Yee & Associates P.C.

(57) ABSTRACT

A magnetic tape head assembly comprised of read and write elements and servo readers placed asymmetrically about the center of the head taken perpendicular to the direction of tape motion is provided. The tape head is capable of reading and writing in two directions of tape motion.

19 Claims, 3 Drawing Sheets

ASYMMETRIC SERVO READER PLACEMENT IN BI-DIRECTIONAL TAPE HEAD

BACKGROUND OF THE INVENTION

1. Technical Field

The present invention relates to magnetic tape heads. More specifically, the present invention relates to a method and apparatus for reducing the complexity of tape heads while accommodating an increased number of data tracks on record media.

2. Description of Related Art

Advanced record media (tapes) store data on multiple data tracks, which run parallel to each other over the length of the tape. However, there is an inherent problem associated with independent data tracks. As the tape moves past the tape head, lateral drift of the tape could result in the head reading or writing on the wrong data track. This would obviously degrade the quality of data storage and retrieval. To ensure that the tape heads are accurately positioned relative to the tape, dedicated servo tracks are usually recorded on the tape parallel to the data tracks. These servo tracks are read by servo readers on the tape head. The servo readers then signal mechanisms within the tape drive that are capable of adjusting the tape head in order to maintain proper alignment with the data tracks. The standard configuration in a three-module read/write/read head is to place servo readers symmetrically about the write module of the tape head. This placement allows the head to read or write in both directions of tape motion in a given position.

Increasing the amount of data on a fixed area of tape can be accomplished either by increasing the linear recording density or increasing the number of data tracks on tape. In the latter case, the data track width is reduced to accommodate the larger number of data tracks on a fixed width of tape. However, the larger number of data tracks requires an increase in the number of possible head positions relative to the tape, in order to accurately read and write the additional data tracks. For example, a 16-track head would require nine separate servo positions to write and read 144 tracks but 18 positions to write 288 tracks on the same tape. To accommodate the extra tracks, typical systems either increase the number of servo tracks on tape or increase the number of servo readers on the head.

However, both options have their drawbacks. If the number of servo tracks on the tape is increased, there will be less space available for data tracks. If the number of servo readers is increased, the tape heads will become more complex, which presents problems for manufacturing, especially as the size of the tape heads is reduced.

Therefore, a tape head design that can efficiently accommodate increased information storage, without increasing complexity is desirable.

SUMMARY OF THE INVENTION

The present invention provides a magnetic tape head assembly comprised of read and write elements and servo readers placed asymmetrically about the center of the head taken perpendicular to the direction of tape motion. The tape head is capable of reading and writing in two directions of tape motion.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
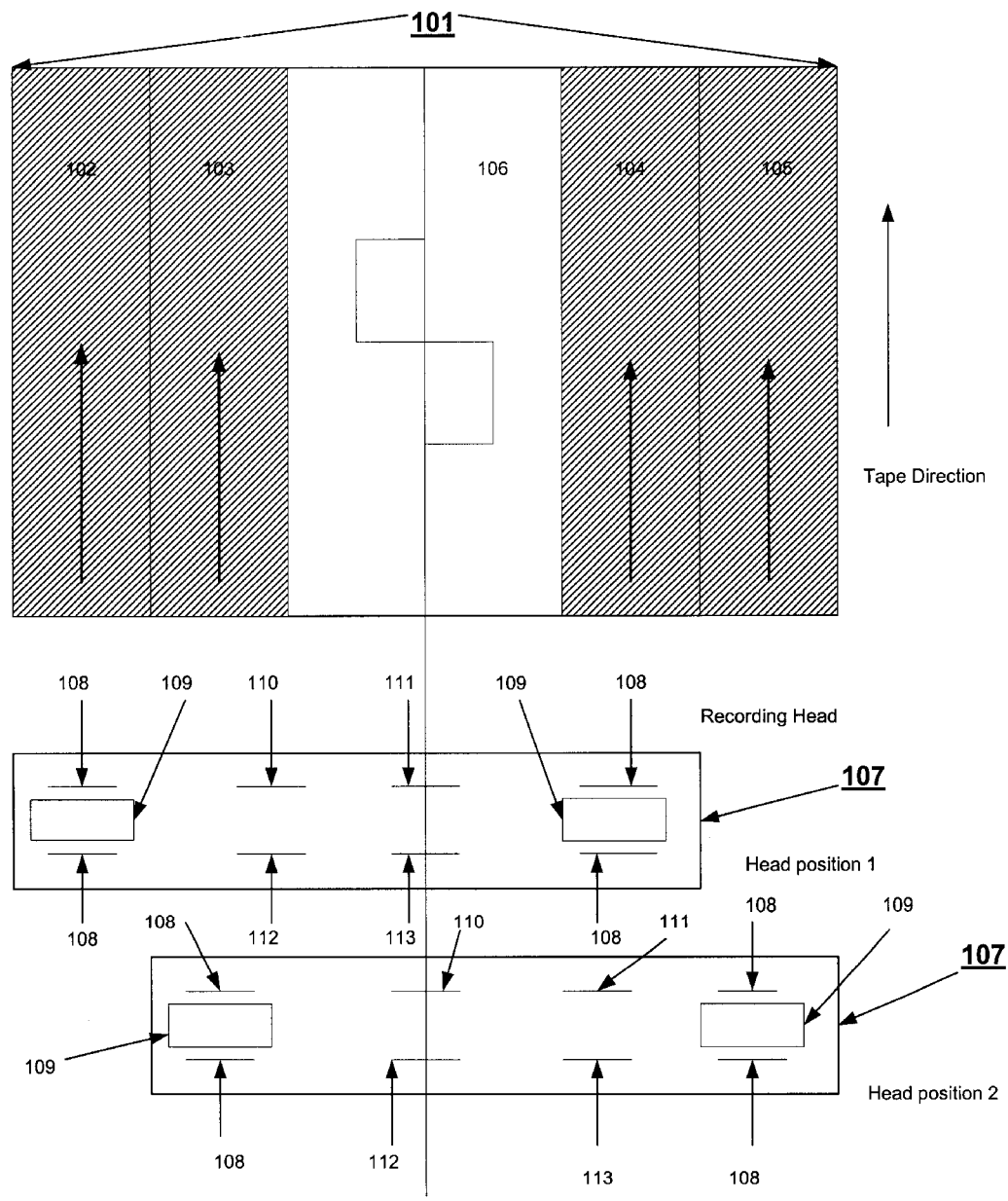
FIG. 1 depicts a two channel recording head with symmetric servo readers and a magnetic tape with four data tracks and one servo track in accordance with the prior art.

With reference now to the figures, and in particular FIG. 1, a schematic diagram illustrating a prior art tape head data track positioning system using servo tracks and symmetric servo readers is depicted. A portion of the tape 101 is divided into data tracks 102, 103, 104, and 105 and a servo track 106, which run parallel to each other over the length of the tape 101. In this example, all four data tracks 102–105 are written in the same direction of tape motion, as indicated by the arrows. The same tape head 107 as viewed looking down on the head/tape interface is represented twice, in different lateral positions relative to the tape 101.

When the tape head 107 is in the first position, the read/write element 108/109 are aligned with data tracks 102 and 104. Each read/write elements 108/109 has read elements 108, which read any data recorded on the tape 101, and write elements 109 that can record new data on the tape 101 if needed.

As the tape 101 passes over the tape head 107, the tape 101 can drift laterally relative to the head 107, resulting in track misregistration in which the read/write elements 108/109 mistakenly read or write on tracks 103 and 105, instead of tracks 102 and 104. Such track misregistration interferes with proper data storage and retrieval.

To prevent track misregistration, a servo track 106 recorded parallel to the data tracks 102–105 is read by dedicated servo readers 110–113. The servo readers signal mechanisms within the tape drive, which are capable of adjusting the tape head 107 in order to maintain proper alignment between the tape 101 and the tape head 107.

In the first head position, servo reader 111 reads the servo track 106 when the tape 101 is moving in the direction indicated by the arrows. The servo reader ensures that the read/write elements 108/109 remain in line with data tracks 102 and 104. If the direction of tape motion is reversed from that shown, the servo track 106 would be read by servo reader 113. It must be pointed out that the choice of which servo reader will read the servo track 106 in each direction of tape motion is arbitrary and depends on the specific application. For example, it is possible for servo reader 113 (rather than servo reader 111) to read servo track 106 in the direction of tape motion indicated by the arrows. The main idea is that there is a separate active servo reader designated for each direction of tape motion.

If the tape head 107 is moved to the second position, the read/write elements 108/109 would be aligned with data tracks 103 and 105. In the direction of tape motion indicated by the arrows, the servo track 106 would be read by servo reader 110. If the direction of tape motion is reversed, the servo track 106 would then be read by servo reader 112. Again, which servo reader is active for each direction of tape motion is arbitrary, the important point being that there is a separate active servo reader for each direction.

Thus, in each position the tape head 107 is able to read and write in both directions of tape motion. In order to accomplish this task, the servo readers 110–113 are placed symmetrically about the write bumps containing write elements 109 and aligned on the read bumps containing read elements 108. However, problems with this symmetric servo placement arise as information storage increases.

Increasing the amount of data on a fixed area of tape can be accomplished either by increasing the linear recording density or increasing the number of data tracks on tape. In the latter case, the data track width is reduced to accommodate the larger number of data tracks on a fixed width of tape. However, the larger number of data tracks requires an increase in the number of possible head positions relative to the tape, in order to accurately read and write the additional data tracks. For example, a 16-track head would require nine separate servo positions to write and read 144 tracks but 18 positions to write 288 tracks on the same tape. To accommodate the extra tracks, typical systems either increase the number of servo tracks on tape or increase the number of servo readers on the head. This problem becomes very clear when one considers the fact that modern tape drives might have to accommodate half-inch tape with as many as 288 data tracks moving at speeds of up to 2 meters per second. Future tape drives will have to deal with even greater track densities.

To accommodate the increased number of tracks on tape, either the number of servo tracks on the tape or the number of servo readers on the head must be increased. Unfortunately, both options have their drawbacks. If the number of servo tracks is increased, there will be less room available on the tape for data tracks. If more servo readers are added, the tape head will become more complex.

Figure 2:
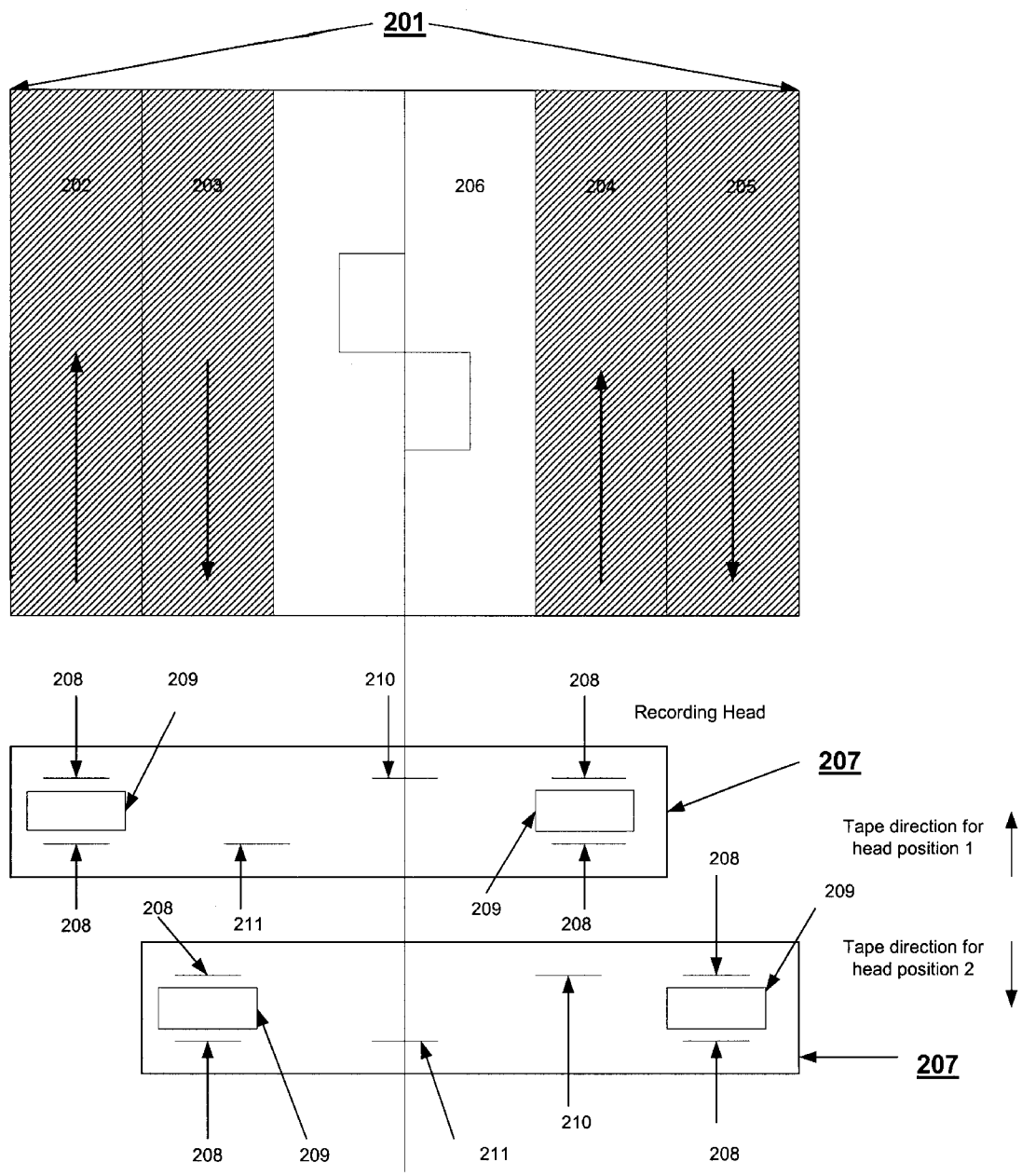
FIG. 2 depicts a two channel recording head with asymmetric servo readers and a magnetic tape with four data tracks and one servo track in accordance with the present invention.

With reference to FIG. 2, a schematic diagram illustrating a tape head is depicted in accordance with the present invention. Like the prior art tape 101 depicted in FIG. 1, the tape 201 is divided into four data tracks 202, 203, 204, and 205 as well as one servo track 206. However, unlike FIG. 1, the four data tracks 202–205 are written in opposite directions of tape motion, as indicated by the arrows. Again, the same tape head 207 as viewed looking down on the head/tape interface is represented twice, in different lateral positions relative to the tape 201.

When the head 207 is in the first position, the read/write elements 208/209 are aligned with data tracks 202 and 204. The servo track 206 is read by servo reader 210. When the head 207 is moved to the second position, the read/write elements 208/209 are aligned with data tracks 203 and 205, and the servo track 206 is read by servo reader 211. As stated above in relation to FIG. 1, for each direction of tape motion, the placement of the active servo reader in relation to the write element 209 is arbitrary and depends on the specific application. Therefore, the asymmetric servo readers in FIG. 2 can also be placed so that they lead the write elements 209. For example, servo readers 210 and 211 could be placed in the positions equivalent to those of servo readers 113 and 110 from FIG. 1, respectively, with no change in direction of tape motion.

In the present invention, each tape head position is reserved for one direction of tape motion, requiring only one servo reader for each position. Therefore, the servo readers 210 and 211 are placed asymmetrically about the write bumps containing write elements 209, and aligned with the read bumps containing read elements 208. By reducing the number of servo readers, the present invention produces a tape head 207 which is less complex than the standard tape head 107 found in the prior art. This reduction in complexity is especially important for manufacturing smaller tape heads in order to accommodate narrower data tracks.

To provide additional protection against track misregistration with the asymmetric servo placement, a small dead zone can be placed between data tracks written in opposite directions of tape motion. Such a dead zone would provide a cushion for lateral drift without requiring the same amount of space as a dedicated servo track.

Figure 3:
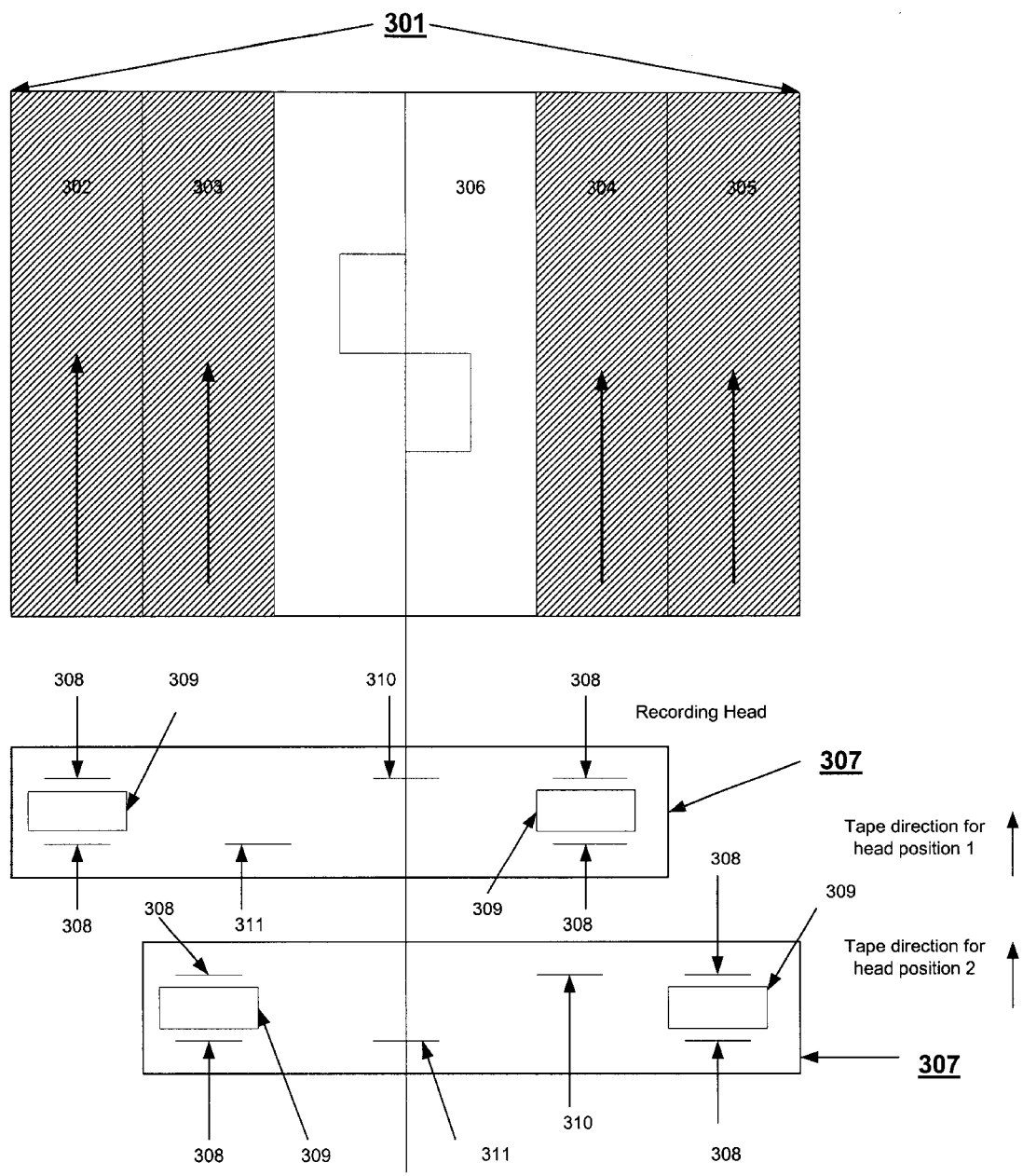
FIG. 3 depicts a two channel recording head with asymmetric servo readers in accordance with an alternative embodiment of the present invention.

Referring now to FIG. 3, a schematic diagram depicts an alternative embodiment of the present invention. In this embodiment all four data tracks 302–305 are written in the same direction of tape motion, as indicated by the arrows. Similar to FIG. 2, the first head position corresponds with reading/writing data tracks 302 and 304, and the second head position corresponds with reading/writing data tracks 303 and 305. In the first head position, servo reader 310 trails the write element 309, due to the tape direction indicated. In the second head position, because the tape is moving in the same direction as position one, servo reader 311 leads the write element 309. If the direction of tape motion was reversed from that shown, servo reader 310 would lead the write element 309 and servo reader 311 would trail the write elements 309.

Since the read-to-write module alignment is fixed, this process of switching between leading and trailing servo readers does not affect track misregistration during the write process. When reading pre-written data tracks with the asymmetric head configuration, the reading is performed by the read element located on the same bump as the servo reader.

The asymmetric servo reader placement is relevant to head configurations other than the three-bump read/write/read tape head. In particular, asymmetric servo readers are applicable to two-bump head designs where the servo readers may be in the same module as the read and write elements.

By relying on an asymmetric servo placement, the present invention allows tape head designers to overcome constraints imposed by traditional, symmetric configurations. Whereas conventional tape head designs require more complexity to deal with increased data storage, the present invention has the double advantage of increasing yield while reducing tape head complexity. The asymmetric servo design provides the enabling technology for a new generation of high-density tape drives.

Although described primarily with reference to tapes with four data tracks and one servo track in the middle, one of ordinary skill in the art will recognize that the principles of the present invention apply equally to tapes with other data track/servo track configurations.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A magnetic tape head assembly comprising:
   read elements;
   write elements; and
   servo readers placed asymmetrically about the center of the tape head taken perpendicular to the direction of tape motion.

2. The magnetic tape head assembly in claim 1, wherein the read/write modules comprise a three-bump read/write/read design.

3. The magnetic tape head assembly in claim 1, wherein the read/write modules comprise a two-bump read/write design comprising read elements and write elements located on the same module.

4. The magnetic tape head assembly in claim 1, wherein the active servo readers trail the write elements.

5. The magnetic tape head assembly in claim 1, wherein the active servo readers lead the write elements.

6. The magnetic tape head assembly in claim 1, wherein the active servo readers switch between leading and trailing the write elements as the tape head changes position.

7. The magnetic tape head assembly in claim 1, wherein the tape head reads and writes in different directions of tape motion as the head changes position.

8. The magnetic tape head assembly in claim 1, wherein the tape head reads and writes in the same direction of tape motion as the head changes position.

9. The magnetic tape head assembly in claim 1, wherein the tape head can read and write in two directions of tape motion, in any head position.

10. A method for manufacturing magnetic tape heads comprising:
    placing read elements on the tape head;
    placing write elements on the tape head; and
    placing servo readers asymmetrically about the center of the tape head taken perpendicular to the direction of tape motion.

11. The method according to claim 10, further comprising placing the read/write elements into a three-bump read/write/read configuration.

12. The method according to claim 10, further comprising placing the read/write elements into a two-bump read/write configuration wherein the read elements and the write elements are located on the same module.

13. The method according to claim 10, further comprising placing the active servo readers in a trailing position relative to the write elements.

14. The method according to claim 10, further comprising placing the active servo readers in a leading position relative to the write elements.

15. A method for reading magnetic tape, comprising:
    reading data tracks on the magnetic tape by means of read elements on a tape head; and
    reading servo tracks on the magnetic tape by means of active servo readers which are placed asymmetrically about the center of the tape head taken perpendicular to the direction of tape motion.

16. The method according to claim 15, wherein the active servo readers switch between leading and trailing positions relative to the write elements as the tape head changes position.

17. The method according to claim 15, wherein the tape head reads and writes in different directions of tape motion as the head changes position.

18. The method according to claim 15, wherein the tape head reads and writes in the same direction of tape motion as the head changes position.

19. The method according to claim 15, wherein the tape head can read and write in two directions of tape motion, in any head position.

* * * * *